Nov. 27, 1945.   L. J. HARRISS ET AL   2,389,905
PIE PAN DISPENSER
Filed April 10, 1941   2 Sheets-Sheet 1
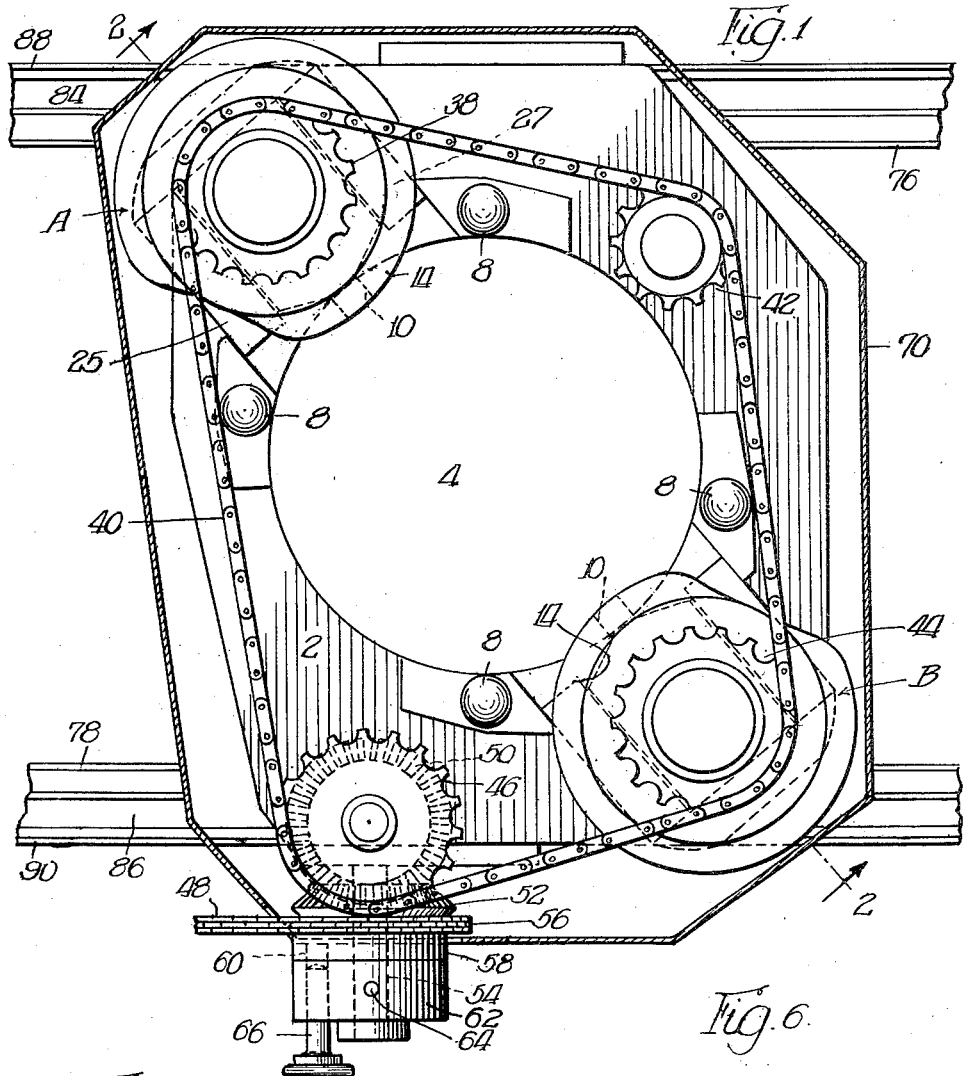
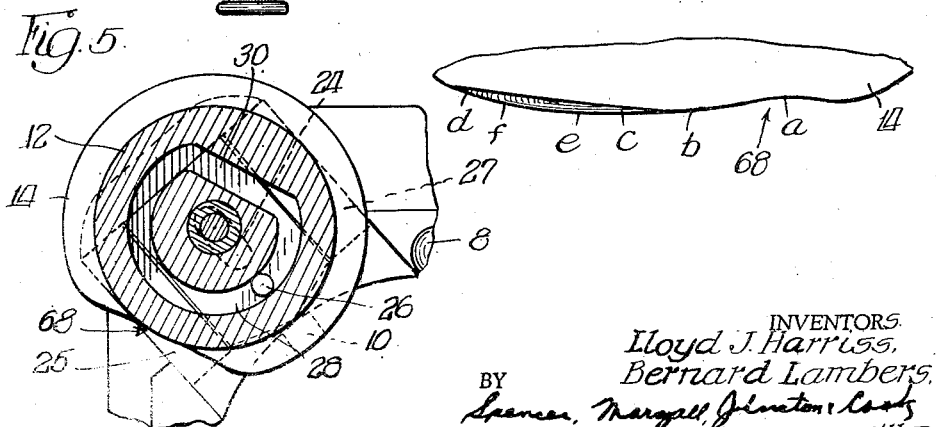
INVENTORS.
Lloyd J. Harriss,
Bernard Lambers.
BY Spencer, Marpall, Johnston, Cook
attys.

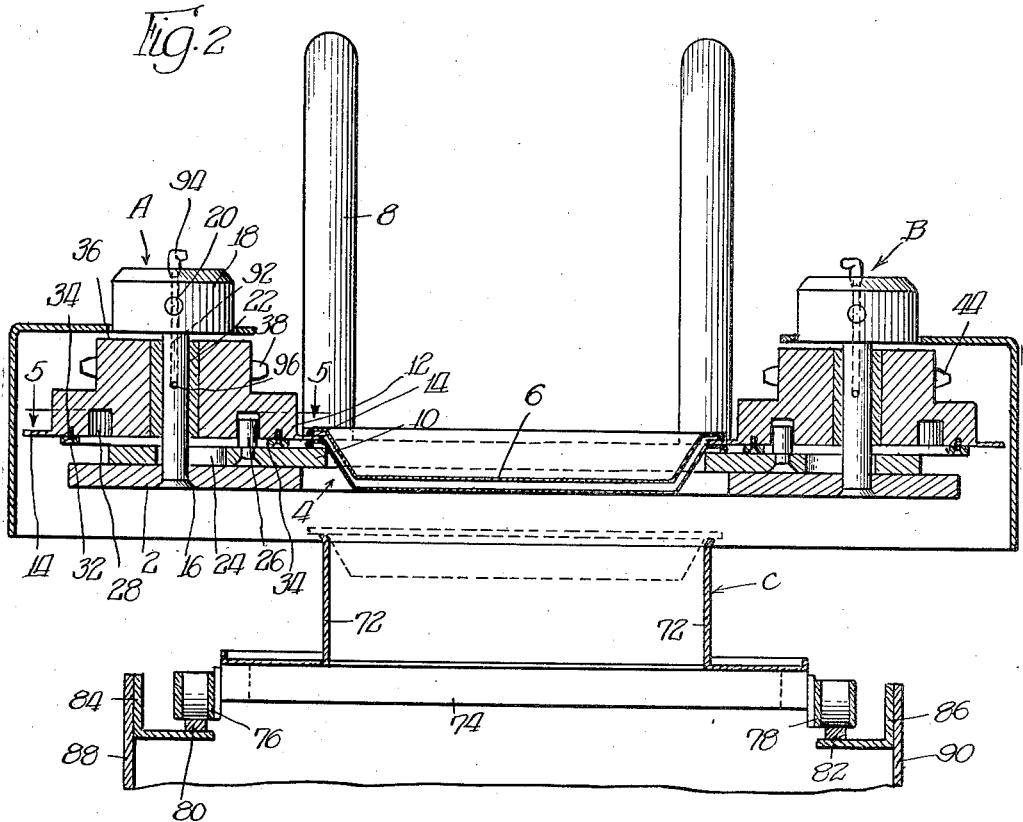
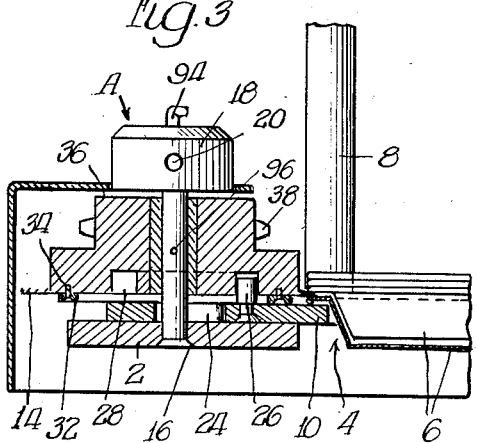
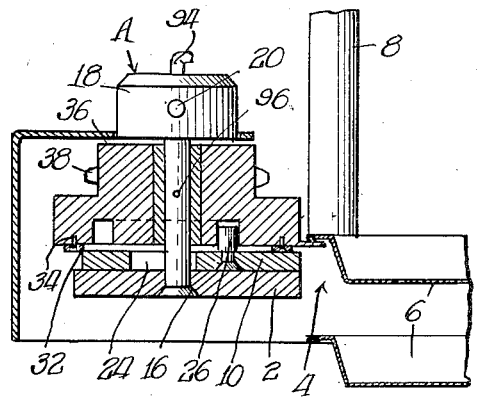

Patented Nov. 27, 1945

2,389,905

UNITED STATES PATENT OFFICE 2,389,905

PIE PAN DISPENSER

Lloyd J. Harriss, Kenilworth, and Bernard Lambers, Oak Park, Ill.; said Lambers assignor to said Harriss Application April 10, 1941, Serial No. 387,820

10 Claims. (Cl. 312—44)

This invention relates to a method and apparatus for dispensing nested receptacles from the bottom of a stack one at a time, and more particularly to a method and apparatus for dispensing such receptacles onto a moving conveyer belt. The invention is especially concerned with a new and improved type of apparatus for dispensing pie tins or pie pans onto an intermittently or continuously moving conveyer belt during the general operation of making pies.

One of the objects of the invention is to provide a new and improved apparatus for separating and dispensing nested receptacles from the bottom of a stack one at a time onto a moving conveyer belt in a positive and accurate manner.

Another object of the invention is to provide a new and improved apparatus for dispensing closely nested receptacles such as pie pans into a predetermined position on a moving conveyer belt.

Still another object of the invention is to provide a new and improved method and apparatus for dispensing pie pans and the like from the bottom of a stack by a mechanism comprising a combination of continuously moving elements adapted to dispense pie pans and the like from the bottom of a stack at predetermined intervals.

Other objects and advantages of the invention will be apparent by reference to the following description in conjunction with the accompanying drawings, in which:

Figure 1 represents a plan view with the top of the housing 70 removed of a preferred type of dispensing mechanism provided in accordance with the present invention for dispensing pie pans one at a time from the bottom of a stack onto a conveyer belt during the general operation of making pies;

Figure 2 is a cross-section taken along the line 2—2 of Figure 1;

Figures 3 and 4 are sectional views of the apparatus shown in Figures 1 and 2, illustrating different operating positions of the device;

Figure 5 is a plan sectional view taken through the line 5—5 of Figure 2;

Figure 6 illustrates the shape or contour of a portion of one of the principal dispensing elements of the mechanism.

Referring to Figures 1 and 2, it will be seen that the device illustrated comprises a frame 2 having an opening or passageway 4 therein through which nested receptacles can be dispensed from the bottom of a stack one at a time.

As shown in Figure 2, the nested receptacles may consist of a plurality of pie pans 6 nested one within the other in an upright or normal position. In order to keep the stack 6 of nested receptacles in alignment, a plurality of columns 8 are provided. In the particular modification shown, four columns are employed, although it will be understood that a greater or lesser number may be used. The columns 8 are so arranged as to permit a slight clearance between the peripheral edge or rim of the pie pans and the columns. In this way the stack 6 is maintained in a substantially upright or vertical position.

The mechanism comprises two principal dispensing elements, one being the reciprocating element 10 and the other being the rotating element 12 which is provided with a separating element 14. As illustrated in Figures 1 and 2, there are two oppositely disposed dispensing devices A and B. Since the elements of each of these devices are the same, the present description will be concerned with only one of them and it will be understood that in all cases like numerals refer to like elements and that the description with respect to one of the dispensing devices is the same with respect to the other. It will also be understood that a greater or lesser number of dispensing devices may be used, although the use of oppositely disposed dispensing devices A and B is preferred, particularly when the articles which are to be dispensed have to be dropped in a predetermined position. Thus, in accordance with the preferred embodiment of the invention, the dispensing mechanism is employed to dispense pie pans, and each pie pan is dropped into a holder or receiver which is part of a traveling conveyer belt or system generally shown at C. The specific construction of the holder C is not completely shown because it does not form a part of the invention, but it is sufficient to say that it has a perimeter such that the rim of the pie pan will nest on the top of the holder in the manner shown in Figure 2. Since each holder preferably surrounds the pie pan, it is important that the pie pans be dropped precisely and accurately.

As illustrated, a pin or axle 16 is attached to the frame 2 of the dispensing device A. The elements 10 and 12 are placed over the pin 16 in the manner shown and are held in place by a collar 18 secured to the axle 16 by means of a set screw 20. The rotating element 12 is provided with a bushing or bearing 22 integral therewith which forms a bearing surface for rotation of said element 12 around the axis or spindle 16. The reciprocating element 10 is provided with a slot 24 through which passes the spindle or axle 16. As shown in Figure 5, the slot 24 has an elongated or generally elliptical shape in order to permit the reciprocating motion of the element 10. Fixed in the reciprocating element 10 is a pin 26 which is operatively associated with the rotary element 12 by means of the channel, groove or passageway 28. As shown in Figure 5, the passageway 28 is generally circular except for a straight portion 30 which acts as a cam track for the pin 26 to cause the element 10 to move back and forth toward and away from the stack of nested receptacles 6. The rotating element 12 is spaced from the reciprocating element 10 by means of an annular metal washer 32 which is fastened to the bottom of the rotating member 12 by rivets 34, or in any other suitable manner. The spacing element 32 may, if desired, be integral with the rotating element 12. However, it is usually desirable to have it separable from the rotating element 12 in order that other spacing elements may be substituted for it for dispensing receptacles in which the rims have a different thickness. The collar 18 may be adjusted by means of the set screw 20 to provide a space 36 between the upper part of the rotating element 12 and the lower part of the collar 18 in order to compensate for variations in thickness of the receptacles being dispensed.

As illustrated, the rotary member 12 is provided with a sprocket portion 38 which is driven by means of a chain 40, as shown in Figure 1. The chain 40 engages with sprocket wheels 38, 42, 44 and 46. The sprocket wheel 42 is merely a guide sprocket. The sprocket wheel 44 is operatively associated with a rotary element in dispensing mechanism B, similar in every respect to the rotary element 12 in dispensing mechanism A. Sprocket 46 is connected by suitable gearing, as shown in Figure 1, to a main drive belt 48. Beneath the sprocket 46 is a miter gear 50 which engages with miter gear 52 mounted on shaft 54 and keyed thereto. The drive belt 48, which is connected to a suitable source of power, not shown, is drivingly associated with a pulley, sprocket or other suitable mechanical means generally indicated by numeral 56. The pulley 56 is not keyed to the shaft 54 directly but is provided with a collar 58 having therein an aperture or hole 60. A second collar 62 is fastened to the shaft 54 by means of a set screw 64. The collar 58 and the collar 62 are keyed together by means of a connecting element 66 which is in the form of a screw with a knob on the end and can readily be screwed in and out. Thus, when the keying element 66 is screwed inwardly, the collars 58 and 62 are connected, causing the pulley to rotate the shaft 54 and the miter gear 52. The miter gear 52 in turn rotates a corresponding miter gear 50 keyed to the sprocket 46 and thereby rotates the entire assembly, including sprockets 38 and 44. In this way the rotary element 12 in each of the dispensing mechanisms A and B is continuously rotated. The separating member 14, being integrally connected or formed with the rotary element 12, likewise rotates continuously.

As shown in Figure 5, the separating element 14 has a generally annular form except for the space or cutaway portion 68. When this cutaway portion comes opposite the central opening 4 wherein the stack of nested receptacles such as pie pans is supported, it will permit the rim of the pie pan to drop by gravity and to fall upon the supporting element 10. This may be termed the loading position of the dispenser. The same operation preferably takes place simultaneously in both of the dispensing mechanisms A and B and the means for accomplishing the operation in each case is the same.

Immediately afterwards the continued rotation of the separating element 14 causes the lowermost pie pan or other receptacle to be separated from the next succeeding pie pan or other receptacle. This is preferably accomplished by forming the element 14 with a contoured edge such as shown in Figure 6. The contoured edge shown in Figure 6 preferably comprises an inwardly extending edge $a$ followed by an outwardly extending edge $b$ which is relatively thin or knifelike, beginning at point $c$, and gradually increases in thickness until it attains the normal thickness of the separating element 14 at point $d$. In the intermediate area between $c$ and $d$ the contour of the edge changes from a slight slope at point $e$ to a deep slope or substantially vertical slope at point $f$, and at the same time is rounded gradually and uniformly. This construction has the advantage that the separating element 14 does not strike against the edges of the pie pans and thereby injure or bend them, nor is there any stoppage of the mechanism due to the unevenness of the pie pan rims because the configuration of the separating element tends to avoid this.

It will be observed in Figure 3 that the knife edge portion of the separating element 14 is entering the space between the rim of the lowermost pie pan and the rim of the next succeeding pie pan. As previously indicated, as long as the reciprocating element 10 remains in the position shown in Figure 5, it will support the lowermost pie pan. However, when the pin 26 reaches the flat space 30 of the cam track in the rotary element 12, it will cause the reciprocating element 10 to move backward lineally in the longitudinal slot 24 guided by guide blocks 25 and 27 away from the opening 4 and in this position the pie pan being no longer supported drops to a receiving station, as shown in Figure 4.

It will be observed that the position of the slot 24 with respect to the pin 16 is substantially reversed in Figures 3 and 4. When the open part of the slot is toward the opening 4 the supporting element 10 will support the lowermost pie pan of the stack, as shown in Figure 3, and when it is away from the opening 4, it will leave the lowermost pie pan unsupported and cause it to drop by gravity, as shown in Figure 4. In this manner the mechanism operates continuously, causing the pie pans or other receptacles, one after the other, to drop to a predetermined station at a predetermined time interval. It will be understood, of course, that although the mechanism operates continuously, the pie pans or other receptacles drop intermittently. The time interval between each dispensing operation may be regulated by regulating the speed of rotation of the belt 48. This may be accomplished in any convenient manner. A housing 70 is provided as a safeguard and also to keep the mechanism free of dirt or other foreign matter.

The invention is not limited to any particular means for receiving the receptacles dispensed, although it is especially valuable in dispensing receptacles such as pie pans onto a moving conveyer such as the conveyer C shown in Figure 2. In the particular type of conveyer mechanism illustrated, a plurality of receiving stations are provided at spaced intervals on a pair of chains or link belts. Thus, as shown in Figure 2, each receiving station may comprise a plurality of upright elements 72 and a transverse element 74 connected at either side to sprocket type belts 76 and 78. The links of the conveyer preferably ride over a pair of tracks 80 and 82, which in turn are supported by angle irons 84 and 86, respectively, from the sides 88 and 90 of a suitable frame or base, not shown.

In order to provide for lubrication of the bearing 22 a hole 92 is bored in the pin 16 and is fitted at the top with a grease gun fitting 94. A lateral hole 96 from the bottom of the hole or aperture 92 through the side of the pin 16 permits grease or other lubricant to escape into contact with the bearing 22. In this way it is possible to lubricate the dispensing mechanism continuously while in operation.

The apparatus described is simple to construct and operate. It has the advantage of functioning smoothly and accurately when once set for a predetermined speed of operation. It will be understood that many variations and modifications may be made without departing from the invention.

Having thus described the invention, what we claim as new and desire to secure by Letters Patent of the United States is:

1. In a dispenser for nested receptacles, a plurality of pairs of separate movable cooperating dispensing elements operatively associated one above the other, each lower element comprising a receptacle supporting and dispensing element, each upper element comprising a separating element for separating the lowermost receptacle of a stack from the next succeeding receptacle and for supporting the stack when a receptacle is being dispensed from the lower element, one of said elements in each pair being unidirectionally rotary and the other being reciprocatory, each rotary element being so shaped as to permit release of the receptacles from the stack and means operatively associated with said elements of each pair to cause them alternately to move into and out of supporting relationship with the stack.

2. In a dispenser for nested receptacles, a plurality of unidirectionally rotary members each provided with means for supporting the next to the lowermost receptacle of a stack of nested receptacles and for releasing said receptacle, a plurality of reciprocating members reciprocable into and out of engagement with said receptacle for supporting and dispensing the receptacle released by said rotary supporting members, and means operatively associated with each of said rotary members and one of said reciprocating members for maintaining at least one plurality of said members in supporting relationship to the stack at all times.

3. In a dispenser for nested receptacles, a plurality of unidirectionally rotary members each provided with means for supporting a stack of nested receptacles and for releasing said receptacles from said stack in predetermined order, a plurality of reciprocable members adapted to reciprocate into and out of supporting relationship with the receptacles released by said rotary members, and means operatively associated with said members to cause the second plurality of members to reciprocate in response to the unidirectional rotary movement of the first plurality of members.

4. In a dispenser for nested pie pans, a set of rotary members for supporting a stack of nested pie pans and so shaped as to release said pie pans from the bottom of said stack one at a time, a set of reciprocable members adapted to reciprocate into and out of supporting relationship with the pie pans released by said rotary members, and means operatively associated between the members of both to cause a member of the second set to reciprocate in response to the rotary movement of a member of the first set, said means comprising a cam track in the members of one set and a cam element fixed to the members of the other set riding in said cam track.

5. In a dispenser for nested pie pans, a set of rotary members for supporting a stack of nested pie pans and provided with means for releasing said pie pans from the bottom of said stack one at a time, a set of reciprocable members adapted to reciprocate into and out of supporting relationship with the pie pans released by said rotary members, and means operatively associated between said members to cause the members of the second set to reciprocate in response to the rotary movement of the members of the first set, said means comprising a cam track in each rotary element and a fixed pin projecting from each reciprocating element into one of said cam tracks.

6. In a dispenser for nested pie pans, a plurality of pairs of separate movable cooperating dispensing elements operatively associated one above the other, the upper element of each pair comprising a rotating member for separating intermediate pie pans of a stack and for supporting the stack when a pie pan is being dispensed from the lower element, each rotating member having a gap in the periphery thereof to permit the receptacles separated thereby to drop to the lower element when opposite said gap, and means operatively associated between said elements of each pair to cause the lower element to move in response to the rotary movement of the upper element and to alternately reciprocate into and out of supporting relationship with the lowermost pie pan of the stack.

7. In a dispenser for nested pie pans, a set of rotary members for supporting a stack of nested pie pans and having means thereon for releasing said pie pans from the bottom of said stack one at a time, a set of reciprocable members adapted to reciprocate into and out of supporting relationship with the receptacles released by said rotary members and positioned one below each of said rotary members, spacing means separating each of said rotary members and the reciprocable member therebelow by a distance substantially equal to the vertical depth of the rim of the pie pan being dispensed, and means operatively associated with said members to cause the lower members to move in response to the rotary movement of the upper members and to alternately reciprocate into and out of supporting relationship with the lowermost pie pan of the stack.

8. In a dispenser for nested pie pans, a plurality of pairs of separate movable cooperating dispensing elements operatively associated one above the other and movable about a common axis, the upper element of each pair comprising a rotating member adapted to rotate around said axis to separate intermediate pie pans of a stack and to support the stack when a pie pan is being dispensed from the lower member and having means thereon to permit release of a pie pan from the stack, the lower element of each pair comprising a reciprocable member having a slot therein through which said axis passes, and means operatively associated with each pair of said elements to cause the upper element to rotate around said axis while simultaneously causing the lower element to reciprocate toward and away from said axis into and out of supporting relationship with the lowermost pie pan of the stack.

9. A dispenser for dispensing nested pie pans onto a conveyer system one at a time from the bottom of a stack, said dispenser comprising a plurality of rotating dispensing elements provided with means moving into and out of supporting relationship with the next to the lowermost pie pan in the stack during the rotation of said elements, a plurality of reciprocating elements adapted to move lineally into and out of supporting relationship with the lowermost pie pan of the stack, means for rotating said rotary elements continuously in the same direction, and means operatively associated between said rotary elements and said reciprocating elements to cause said reciprocating elements to reciprocate in response to said rotary movement of said rotary elements thereby permitting pie pans to be dropped from the bottom of the stack at predetermined intervals one at a time.

10. In a dispenser for nested receptacles, a plurality of dispensing elements at one level capable of movement unidirectionally for supporting and releasing the receptacles of a stack, another plurality of dispensing elements at another level for supporting and releasing the receptacles of said stack, means for continuously moving said dispensing elements at one level unidirectionally during the actuation of said dispenser, and means for moving said plurality of dispensing elements at said other level in synchronism with the movement of said first plurality of said dispensing elements, whereby the dispensing elements at one level support the stack above the lowermost receptacle while the dispensing elements at the other level are releasing the lowermost receptacle, thereafter the dispensing elements at the first level release the stack while the dispensing elements at the second level support it, after which the dispensing elements at the first level reengage the stack above the lowermost receptacle and all of the dispensing elements are in position to repeat the cycle of operations.

LLOYD J. HARRISS.
BERNARD LAMBERS.